United States Patent
Suzuki

(10) Patent No.: US 7,933,182 B2
(45) Date of Patent: Apr. 26, 2011

(54) OPTICAL INFORMATION RECORDING AND REPRODUCING APPARATUS THAT SETS A MOVABLE RANGE OF AN OBJECTIVE LENS BASED ON THE TYPE OF RECORDING MEDIUM

(75) Inventor: Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 11/947,344

(22) Filed: Nov. 29, 2007

(65) Prior Publication Data

US 2008/0144474 A1    Jun. 19, 2008

(30) Foreign Application Priority Data

Dec. 13, 2006  (JP) .................................. 2006-335810
Sep. 25, 2007  (JP) .................................. 2007-247621

(51) Int. Cl.
*G11B 20/18* (2006.01)
(52) U.S. Cl. .................................... 369/53.2; 369/53.41
(58) Field of Classification Search ........ 369/53.1–53.39, 369/112.01–112.29
See application file for complete search history.

(56) References Cited

U.S. PATENT DOCUMENTS

| | | | |
|---|---|---|---|
| 5,793,735 A | | 8/1998 | Oono |
| 5,859,824 A | * | 1/1999 | Izumi et al. ................. 369/44.29 |
| 6,061,310 A | * | 5/2000 | Iida ............................ 369/44.27 |
| 6,101,156 A | * | 8/2000 | Tanaka et al. ............... 369/44.28 |
| 6,469,965 B1 | * | 10/2002 | Horita ........................... 369/53.2 |
| 7,164,638 B2 | * | 1/2007 | Wada et al. ................. 369/53.19 |
| 2001/0019520 A1 | * | 9/2001 | Uemura et al. ............. 369/44.23 |
| 2006/0187786 A1 | * | 8/2006 | Torii ............................ 369/47.54 |
| 2006/0193217 A1 | * | 8/2006 | Mori et al. .................. 369/44.23 |
| 2006/0203628 A1 | * | 9/2006 | Komma et al. ............. 369/44.25 |
| 2006/0221782 A1 | * | 10/2006 | Kanenaga ................... 369/44.23 |
| 2008/0151730 A1 | * | 6/2008 | Kikukawa et al. ............... 369/94 |
| 2008/0151731 A1 | * | 6/2008 | Itoh et al. .......................... 369/94 |
| 2008/0247291 A1 | * | 10/2008 | Kawaguchi ................. 369/53.23 |
| 2009/0010137 A1 | * | 1/2009 | Komma et al. ............ 369/112.23 |
| 2009/0046564 A1 | * | 2/2009 | Yamasaki et al. ......... 369/112.24 |
| 2009/0290466 A1 | * | 11/2009 | Aoki et al. .................. 369/53.31 |
| 2009/0290479 A1 | * | 11/2009 | Mimura et al. ........... 369/112.23 |
| 2010/0103803 A1 | * | 4/2010 | Yamasaki et al. ......... 369/112.24 |
| 2010/0195453 A1 | * | 8/2010 | Miyamoto et al. .......... 369/44.11 |

FOREIGN PATENT DOCUMENTS

| | | |
|---|---|---|
| JP | 8-212611 | 8/1996 |
| JP | 10-106012 | 4/1998 |
| JP | 11-16200 | 1/1999 |

* cited by examiner

*Primary Examiner* — Tan X Dinh

(74) *Attorney, Agent, or Firm* — Fitzpatrick, Cella, Harper & Scinto

(57) ABSTRACT

An information recording and/or reproducing apparatus capable of obtaining a certain recording/reproducing margin with a simplified structure. The apparatus identifies whether an optical disc is a single-layer recording medium having one recording layer, or a multilayer recording medium having a plurality of recording layers, and sets a control range (movable range) of an objective lens on the basis of the identification result. When the optical disc is identified as a multilayer recording medium, the control range of the objective lens is set to be smaller than that for a single-layer recording medium. Further, the control range of the objective lens is set for each of the recording layers of the optical disc.

5 Claims, 10 Drawing Sheets

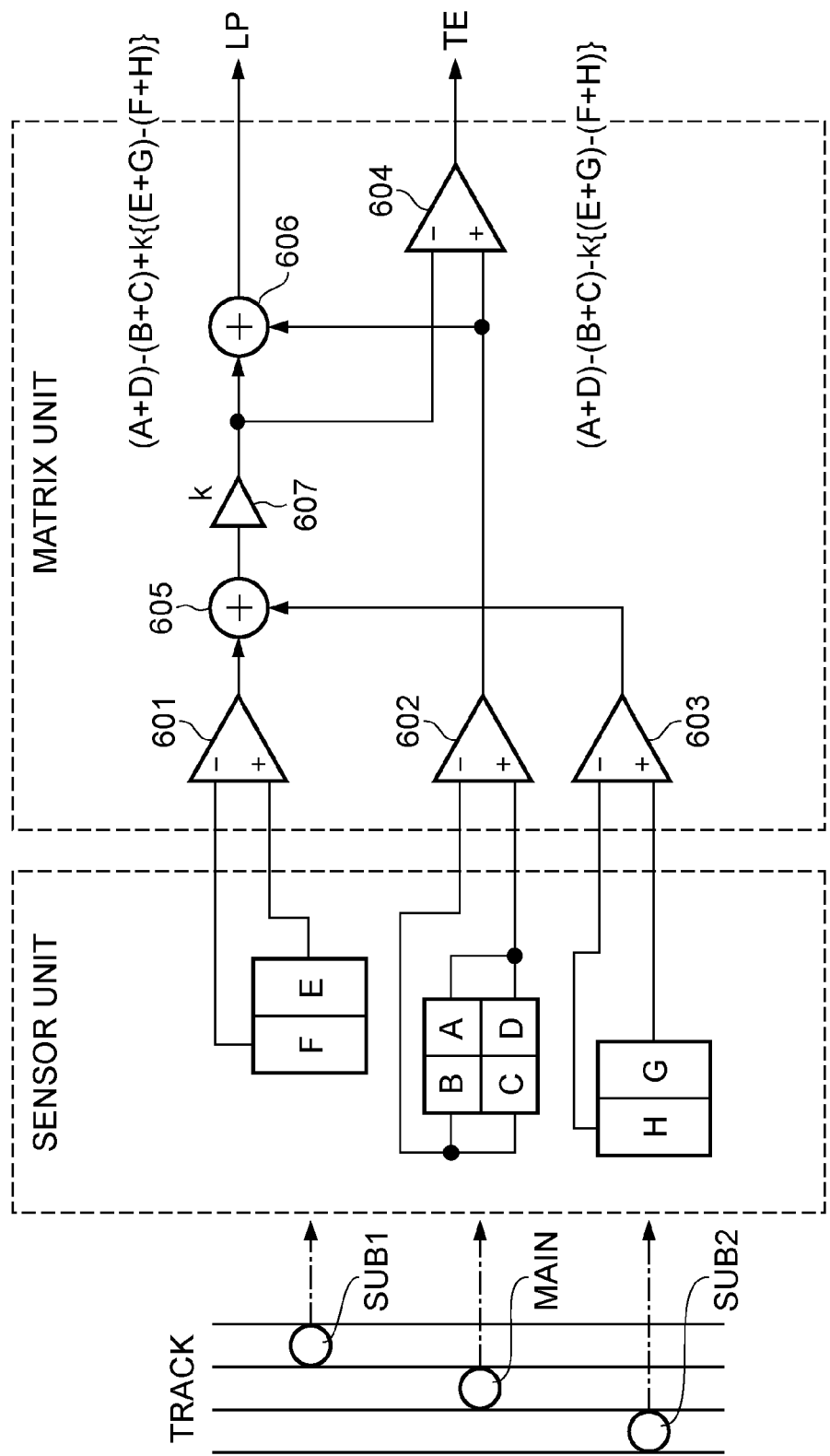

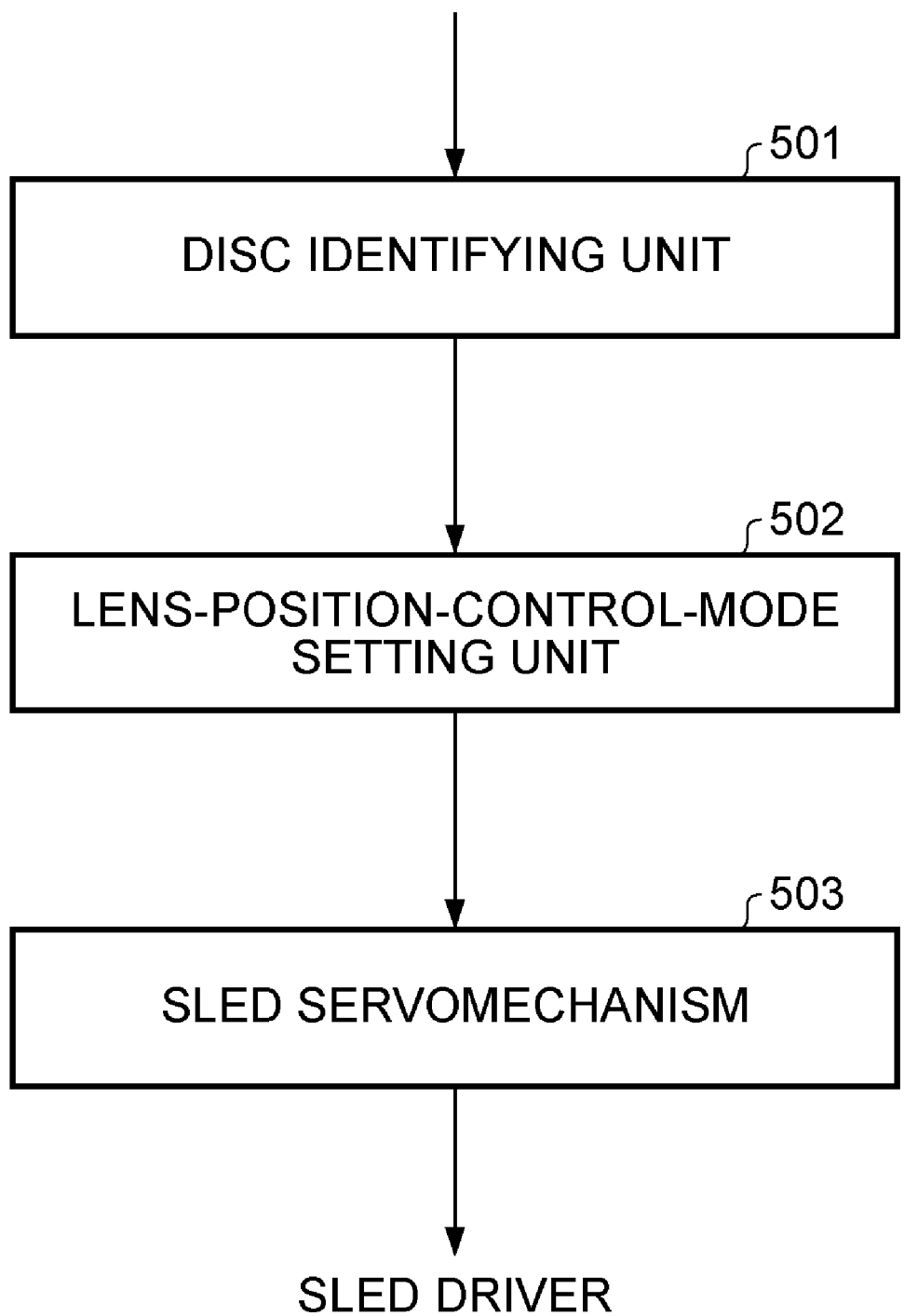

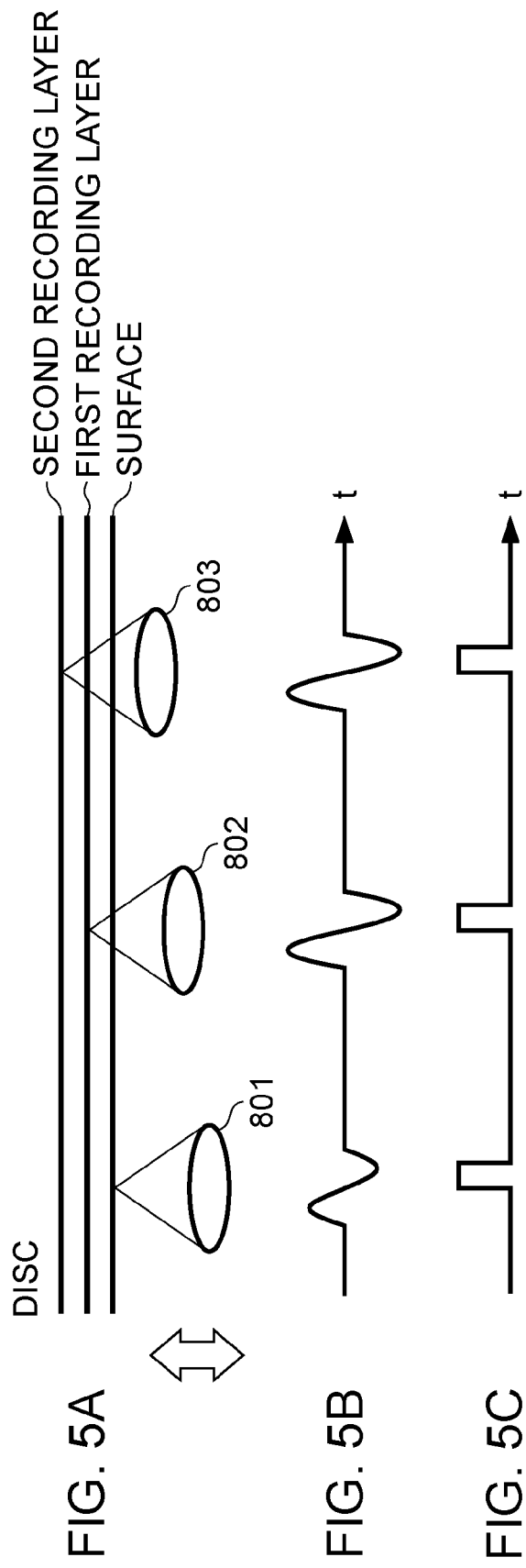

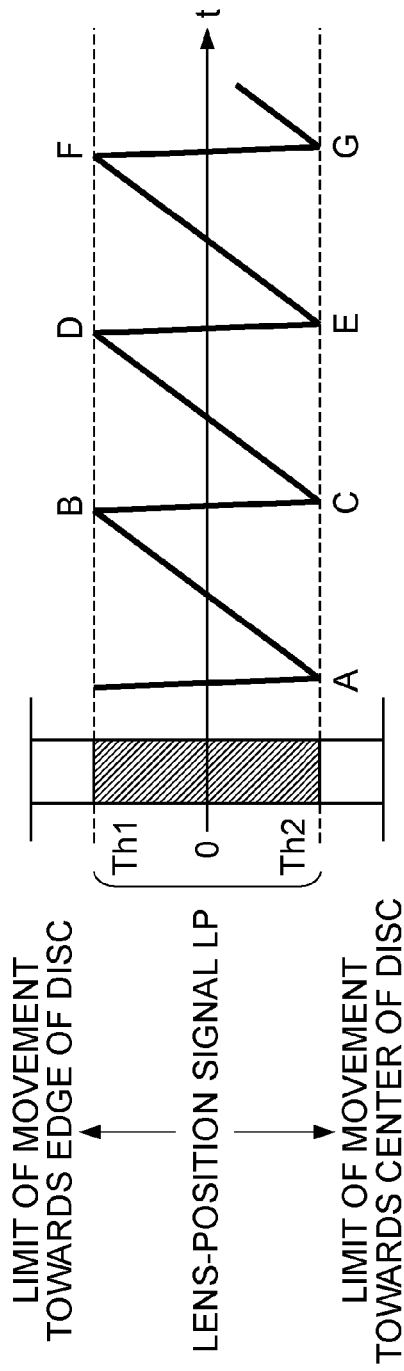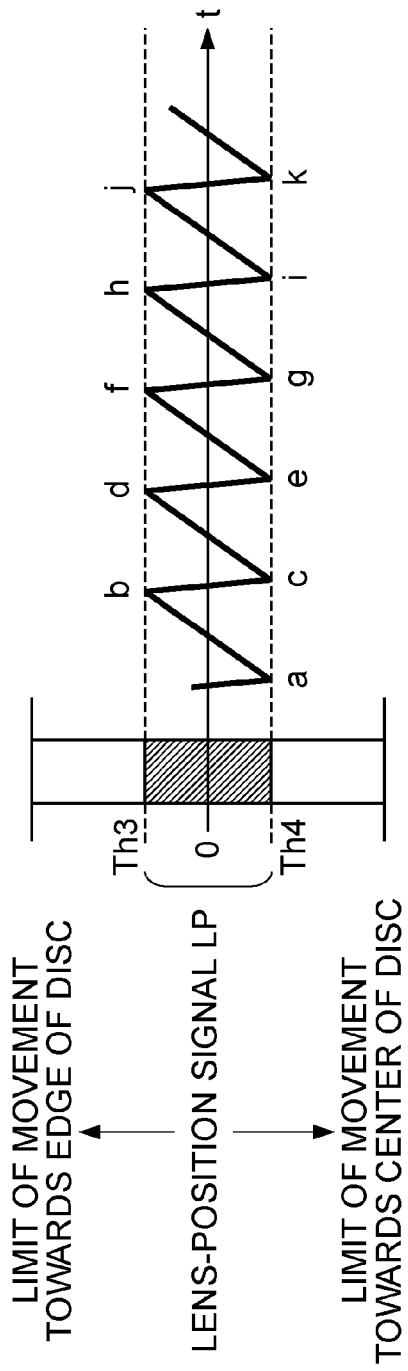

| DISC | LENS-POSITION CONTROL MODE | CONTROL RANGE OF OBJECT LENS |
|---|---|---|
| DOUBLE-LAYER DISC | MODE 2 | ±150 [ μm ] |
| SINGLE-LAYER DISC | MODE 1 | ±300 [ μm ] |

| RECORDING LAYER | LENS-POSITION CONTROL MODE | CONTROL RANGE OF OBJECT LENS |
|---|---|---|
| SECOND RECORDING LAYER | MODE 4 | ±150 [μm] |
| FIRST RECORDING LAYER | MODE 3 | ±200 [μm] |

| TRACKING SERVO-ACCESS LAYER | RECORDING STATUS OF ADJACENT RECORDING LAYER | CONTROL RANGE OF OBJECT LENS |
|---|---|---|
| SECOND RECORDING LAYER | FIRST RECORDING LAYER: UNRECORDED | ±150 [μm] |
| | FIRST RECORDING LAYER: RECORDED | ±100 [μm] |
| FIRST RECORDING LAYER | SECOND RECORDING LAYER: UNRECORDED | ±200 [μm] |
| | SECOND RECORDING LAYER: RECORDED | ±150 [μm] |

OPTICAL INFORMATION RECORDING AND REPRODUCING APPARATUS THAT SETS A MOVABLE RANGE OF AN OBJECTIVE LENS BASED ON THE TYPE OF RECORDING MEDIUM

This application claims the benefit of Japanese Application No. 2006-335810, filed Dec. 13, 2006, and No. 2007-247621, filed Sep. 25, 2007, which are hereby incorporated by reference herein in their entirety.

BACKGROUND OF THE INVENTION

1. Field of the Invention

The present invention relates to an information recording and/or reproducing apparatus that optically records and/or reproduces information onto/from an information recording medium, such as an optical disc.

2. Description of the Related Art

Disc media, such as optical discs (hereafter referred to as "discs"), have been developed as leading information recording media because of their portability, usability, fast and random access/response characteristics, and the like. In recent years, with increases in packing densities and transfer rates of discs, small-diameter discs having large capacities have been employed in mobile image-recording apparatus, such as high-definition (HD) digital cameras and video camcorders. The market for such discs is growing.

In particular, HD-image-enabled products, such as compact-and-light HD cameras and HD displays, are rapidly becoming popular. Now, HD images, which once were handled only by commercial apparatuses, can be filmed or viewed with consumer apparatuses. Under these circumstances, to meet the market needs for filming and storing lengthy HD images, large-capacity discs are being developed.

One of the promising technologies to provide large-capacity discs is a multilayer technology in which a plurality of recording/reproducing layers are stacked in one disc. For example, the standardized number of recording/reproducing layers for digital versatile discs (DVDs) is two. A DVD has, from a side on which a light beam for recording and/or reproducing information is incident, a cover layer, a first recording layer, and a second recording layer. A reflective film is formed on the second recording layer, and an intermediate layer is provided between the first and second recording layers. Light quantities reflected from the first and second recording layers are designed to be equal.

A typical optical disc apparatus has an optical head (hereafter, referred to as an "optical pickup") that emits a light beam to perform recording and/or reproducing of information onto/from a disc. The optical pickup consists of a laser source, an optical lens group including an objective lens for focusing a light beam onto a disc surface, an actuator for driving the objective lens, and the like.

The optical disc apparatus has a focus servomechanism and a tracking servomechanism for causing a beam spot to follow a target track on a disc surface in order to drive and to control the optical pickup and to perform recording and/or reproducing of information onto/from a disc. The tracking servomechanism detects light reflected from a disc with an optical sensor, processes the detection result, and generates a tracking-error signal. Radial-position control of the objective lens with respect to the disc is performed according to the polarity or level of the error signal.

A sled mechanism for radially moving the entirety of the optical pickup with respect to the disc is provided so that the objective lens moves in the vicinity of the optical axis of the optical pickup. The sled mechanism controls the optical pickup to access a desired track positioned from the center to the edge of the disc through operations such as address-seek, track-trace, and track-jump.

Multilayer-disc-enabled optical disc apparatuses have many problems. A variation in thickness of a layer between a light incident surface and each of the recording/reproducing layers of a disc causes wave aberration. Because the quality of the beam spot directly affects recording and/or reproducing of information, an increase in wave aberration degrades recording/reproducing quality, i.e., narrows a recording/reproducing margin.

Further, light reflected from a layer other than a tracking servo-access layer may leak into the tracking servo-access layer and produce a noise element (hereafter, referred to as "crosstalk"). This also narrows the recording/reproducing margin. These are inherent problems of multilayer discs.

Japanese Patent Laid-Open Nos. 10-106012, 08-212611, and 11-016200 disclose techniques to overcome these problems.

Japanese Patent Laid Open No. 10-106012 discloses a method of compensating for spherical aberration due to a variation in thickness of a disc, in which means for driving an optical element constituting an optical pickup in the optical axis direction is provided. Japanese Patent Laid-Open No. 08-212611 discloses an apparatus for compensating for spherical aberration, in which liquid crystal elements are provided in an optical path of an optical pickup. By applying a voltage to the liquid crystal elements, depending on the aberration, the phase of a light beam is differentiated, whereby compensation can be made for the spherical aberration.

Japanese Patent Laid-Open No. 11-016200 discloses an optical pickup in which an optical member for splitting reflected light into a plurality of rays is provided. By processing these rays, leakage of reflected light into a layer from another layer can be minimized, whereby a certain recording/reproducing margin can be obtained.

FIG. 14 is a qualitative diagram showing an increase in spherical aberration, which is a dominant aberration, in relation to an increase in the number of recording layers of a disc. In FIG. 14, the spherical aberration is plotted on the ordinate and the number of recording layers of a disc on the abscissa. As is well known, spherical aberration increases in proportion to an increase in variation in thickness of a disc. Accordingly, an increase in the number of recording layers constituting a disc, for example, from one layer to two layers, increases the spherical aberration, and consequently, degrades the quality of the beam spot. It is also known that an increase in numerical aperture (NA) of an objective lens of an optical pickup and use of a short-wavelength laser increase the spherical aberration. In particular, because of the multilayer structure of a disc, a farther recording layer (i.e., a recording layer farther from a light incident side) tends to be more largely affected by a variation in thickness of an intermediate layer and tends to have narrower margins, such as a recording/reproducing margin and a tilt margin.

Further, coma aberration caused by a tilt tends to occur due to factors, such as a disc having a multilayer structure, an objective lens having a high NA, and a laser having a short wavelength. Therefore, a farther recording layer has a narrower tilt margin. Thus, it is difficult for a multilayer-disc-enabled optical disc apparatus to obtain a recording/reproducing margin in a farther recording layer of a disc.

The methods and apparatuses described in the aforementioned Japanese Patent Laid-Open Nos. 10-106012, 08-212611, and 11-016200 intend to obtain a recording/reproducing margin by providing mechanisms that compensate for increases in spherical aberration.

Japanese Patent Laid-Open No. 10-106012 discloses a method in which means for driving an optical element is provided on an optical pickup for performing recording and/or reproducing of information onto/from a disc. Japanese Patent Laid-Open No. 08-212611 discloses an apparatus in which liquid crystal elements are provided. Japanese Patent Laid-Open No. 11-016200 discloses an optical pickup in which an optical member for splitting reflected light into a plurality of rays is provided. The methods and apparatuses described in the aforementioned three documents compensate for increased aberration by providing dedicated compensation mechanisms.

However, optical disc apparatuses for mobile use are assumed to be held by users with one hand and used outdoors. To make housings of these optical disc apparatuses compact, components constituting optical pickups are being further downsized. In addition, in order to meet the market needs for filming and storing lengthy HD images, large-capacity multilayer discs need to be developed. Obtaining a recording/reproducing margin in an optical disc is also extremely important.

The methods and apparatuses described in the aforementioned three documents have increased the size and weight of the optical pickups, the number of control signal lines, etc., and have failed to reduce the size and weight, as well as the manufacturing cost, of optical disc apparatuses.

SUMMARY OF THE INVENTION

The present invention provides an information recording and/or reproducing apparatus capable of obtaining a certified recording/reproducing margin with a simplified structure, without employing a new mechanism or member.

Specifically, the information recording and/or reproducing apparatus identifies whether an information recording medium is a single-layer recording medium having one recording layer or a multilayer recording medium having a plurality of recording layers, and sets a control range (movable range) of an objective lens on the basis of the identification result. In the case when the information recording medium is identified as being a multilayer recording medium, the control range of the objective lens is set for each of the recording layers of the information recording medium.

Further features of the present invention will become apparent from the following description of exemplary embodiments, with reference to the attached drawings.

BRIEF DESCRIPTION OF THE DRAWINGS

FIG. 3 is a functional block diagram of a sensor unit and a matrix unit;

FIG. 4 is a functional block diagram of a system controller;

FIGS. 5A to 5C illustrate operation of the disc identification and signal waveforms;

FIGS. 6A and 6B illustrate control ranges of the objective lens;

Preferred embodiments of the present invention will now be described in detail with reference to the drawings.

FIRST EMBODIMENT

Figure 1:
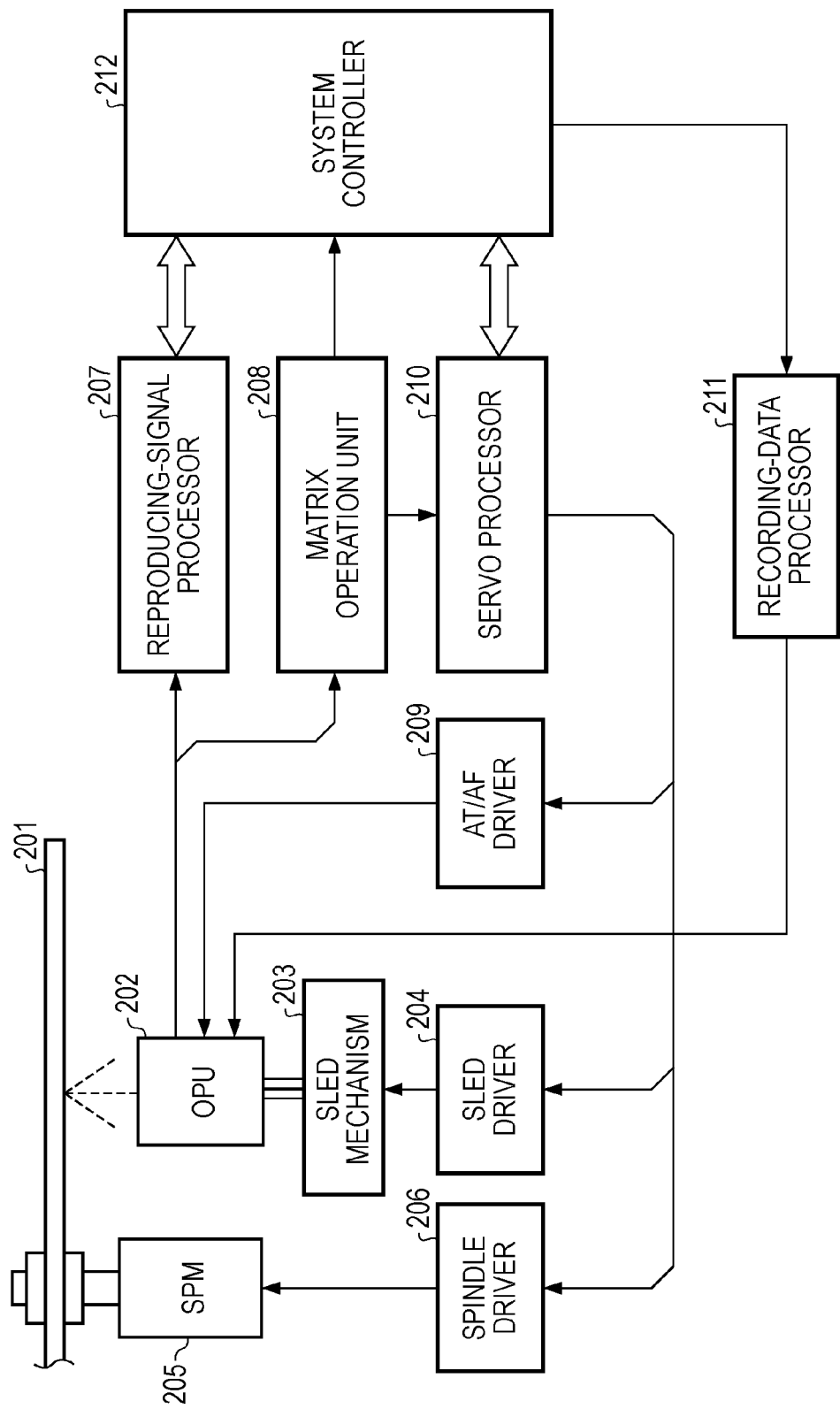
FIG. 1 is a block diagram of an information recording and/or reproducing apparatus according to the invention.

Overall Structure and Series of Operations According to the First Embodiment FIG. 1 is a block diagram of an information recording and/or reproducing apparatus according to the first embodiment of the invention. In FIG. 1, an optical disc (hereafter, referred to as a "disc") 201 is an information recording medium. In the embodiment, the disc 201 is either a single-layer recording medium having one recording layer or a double-layer recording medium having two recording layers, onto/from which information can be recorded and/or reproduced. A disc having two or more recording layers is referred to as a "multilayer recording medium."

An optical pickup (OPU) 202 emits a light beam onto the disc 201 to record and/or reproduce information, a spindle motor (SPM) 205 rotates the disc 201, a spindle driver 206 drives the spindle motor 205, and an auto tracking (AT)/auto focusing (AF) driver 209 drives an AT/AF actuator (not shown) in the optical pickup 202.

A sled mechanism 203 radially moves the optical pickup 202 with respect to the disc 201, a sled driver 204 drives the sled mechanism 203, and a servo processor 210 performs servo controls including spindle control, focus control, tracking control, and sled control.

A reproducing-signal processor 207 processes reproducing signals, a recording-data processor 211 processes recording data, a matrix operation unit 208 generates signals related to the servo controls, such as a focus-error signal, a tracking-error signal, and a lens-position signal, and a system controller 212 controls the overall apparatus.

Referring to FIG. 1, a basic operation of the information recording and/or reproducing apparatus will be described. The system controller 212 has a central processing unit (CPU) (not shown) and controls the overall operation of the optical disc apparatus by executing a priority command or a predetermined program according to an instruction from an operation system (not shown).

The disc 201 is, for example, a phase change recording medium, whose recording layer is composed of a phase change material, such as a Ge—Sb—Te series material. While the disc 201 is being spun, the optical pickup 202 emits a light beam onto a recording layer of the disc 201 while changing the strength of the beam. This causes the phase of the recording layer to change from crystalline to amorphous, and vice versa. To change the phase of the recording layer from crystalline to amorphous, a pulsed light beam is emitted onto the recording layer. Once melted, the recording layer is quenched.

In contrast, to change the phase of the recording layer from amorphous to crystalline, a relatively weak light beam is emitted onto the recording layer so as to anneal the layer at a crystallization temperature or higher. Thus, information represented by ones or zeros can be recorded onto the disc 201, utilizing the phase change characteristics thereof.

The optical pickup 202 includes an optical coupling system, a laser source (for example, a semiconductor laser), a laser driver that drives the laser source, an objective lens that focuses a light beam emitted from the laser source onto a recording layer of an optical disc, the AT/AF actuator that drives the objective lens in both the focusing and tracking directions, photodetectors that detect light reflected from the disc, and the like.

The optical pickup 202 emits a light beam (for example, laser light) onto the disc 201, controls the position of the light beam (beam spot), and detects light reflected from the disc. The servo processor 210 performs servo controls.

Using the spindle driver 206, the servo processor 210 performs rotation control of the spindle motor 205 by the so-called constant linear velocity (CLV) method. The disc 201 has wave-shaped marks, called wobble marks, provided along track grooves. The servo processor 210 controls the spinning speed of the disc, so that the frequency of the wobble equals a predetermined value.

The optical pickup 202 has the AT/AF actuator that drives the objective lens in both the tracking and focusing directions. The AT/AF driver 209 is controlled on the basis of a tracking-error signal and a focus-error signal obtained by detecting and processing light reflected from the disc 201. The AT/AF actuator controls the movement of the objective lens in both the tracking and focusing directions.

The AT/AF actuator performs focus control for maintaining the beam spot to be focused on a target track on the spinning disc 201, and tracking control for causing the beam spot to follow information tracks along the grooves. The sled driver 204 drives the sled mechanism 203 to relatively control positions of the optical pickup 202 and the objective lens. The position of the objective lens is controlled in cooperation by the AT/AF actuator that performs fine adjustment and the sled mechanism 203 that performs rough adjustment.

Figure 2:
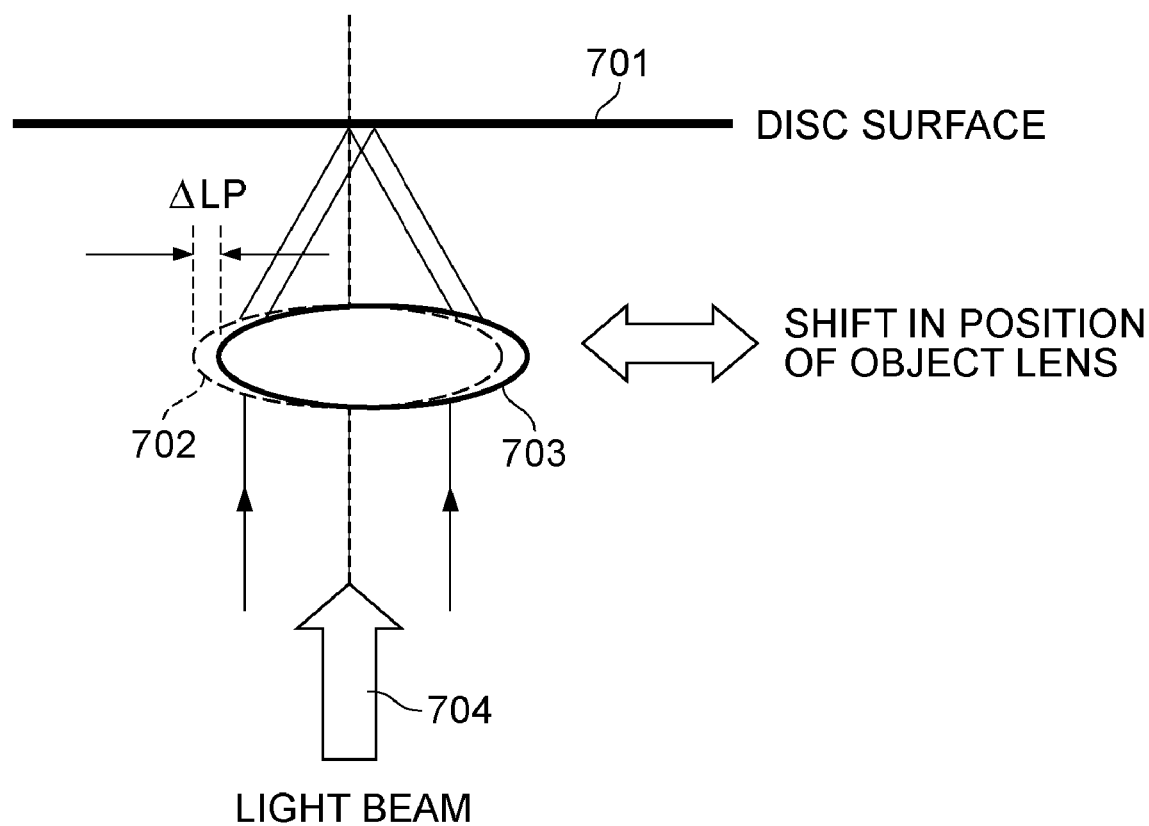
FIG. 2 is a schematic view showing a shift in position of an objective lens.

FIG. 2, which is a schematic view showing lens-position control (fine adjustment) performed by the AT/AF actuator, shows a disc surface 701, positions 702 and 703 of the objective lens, and a light beam 704. When the objective lens is in the position 702, the objective lens is aligned with the optical axis of the light beam at its center and follows the tracks on the disc surface 701.

The AT/AF actuator shifts the objective lens from the position 702 to the position 703 by an amount ΔLP to cause the beam spot to follow the target track and to perform a recording and/or reproducing operation. When the objective lens is in the control range of the AT/AF actuator, the sled mechanism 203 does not move. The AT/AF actuator radially shifts the objective lens with respect to the disc to cause the objective lens to follow the tracks.

Referring back to FIG. 1, when the lens-position signal LP indicates that the objective lens is positioned at an end of the control range of the AT/AF actuator, the servo processor 210 actuates the sled mechanism 203 to radially move the optical pickup 202 with respect to the disc (rough adjustment). By using the fine adjustment by the AT/AF actuator and the rough adjustment by the sled mechanism 203 in combination, the objective lens is made to follow a predetermined track on the disc. As will be described below, the lens-position signal LP can be generated by output signals of sensors in the optical pickup 202.

A sensor signal obtained by the optical pickup 202 is sent to the reproducing-signal processor 207. The reproducing-signal processor 207 performs auto gain control, pre-filtering, and analog-to-digital conversion. From the digitized reproducing signal, a clock frequency synchronized with an edge of the reproducing signal is generated using the phase-locked loop (PLL) of the reproducing-signal processor 207. The reproducing-signal processor 207 further performs waveform equalization using an equalizer, data detection by partial-response maximum-likelihood (PRML), demodulation, error correction, and the like.

The operation of recording data onto a disc as an information recording medium will now be described. The recording-data processor 211 (shown in FIG. 1) performs predetermined modulation and data conversion, according to the recording format of the disc, on the recording signal to be sent to the disc 201. The laser driver (not shown) is contained in the optical pickup 202 and performs a known write strategy processing, and controls a lighting cycle of the laser according to the pattern of the recording data.

Referring to FIG. 3, a method of generating the lens-position signal LP will be described. FIG. 3 illustrates locations of light spots on a track according to a three-beam differential push-pull (DPP) method, a sensor unit, and a matrix unit. The sensor unit of FIG. 3 corresponds to photodetectors in the optical pickup 202, and the matrix unit corresponds to the matrix operation unit 208 in FIG. 1.

As shown in FIG. 3, a main beam MAIN is controlled to be positioned at the center of the track. Sub-beams SUB1 and SUB2 are controlled to be positioned at the positions radially shifted from the position of the main beam MAIN by half a track. The sensor unit has sensors corresponding to the three beams, i.e., a four-division sensor (A to D) is provided for the main beam MAIN, and two-division sensors (E and F, G and H) are provided for the sub-beams SUB1 and SUB2, respectively.

Referring to FIG. 3, functional blocks for processing output signals from each of these sensors, namely, computing devices 601 to 604, adding devices 605 and 606, and a coefficient computing device 607, are provided in the matrix unit. Light reflected from the main beam MAIN is received by the four-division sensor (A to D).

Output signals (A+D) and (B+C) of the four-division sensor are inputted into the computing device 602, where (A+D)−(B+C) is calculated and outputted. Light reflected from the sub-beam SUB1 is received by the two-division sensor (E and F). The output signals of the two-division sensor are inputted into the computing device 601, where (E−F) is calculated and outputted.

Light reflected from the sub-beam SUB2 is received by the two-division sensor (G and H). The output signals of the two-division sensor are inputted into the computing device 603, where (G−H) is calculated and outputted. The signals (E−F) and (G−H) are then inputted into the adding device 605, where (E+G)−(F+H) is calculated and outputted. Then, the signal (E+G)−(F+H) is multiplied by a predetermined coefficient k at the coefficient computing device 607, where k{(E+G)−(F+H)} is calculated and outputted.

A tracking-error signal TE can be obtained by calculation performed by the computing device 604 as follows:

$$TE=(A+D)-(B+C)+k\{(E+G)-(F+H)\}.$$

Although a push-pull signal of the main beam can be obtained as the signal (A+D)−(B+C) outputted by the computing device 602, the signal contains an offset component due to a radial shift in position of the objective lens with respect to the disc. Therefore, the tracking-error signal TE excluding the offset component is generated by multiplying the push-pull component signal (E+G)−(F+H) of the subbeams by the predetermined coefficient k and subtracting the result from the signal (A+D)−(B+C).

The lens-position signal LP can be obtained by calculation performed by the adding device 606 as follows:

$$LP=(A+D)-(B+C)+k\{(E+G)-(F+H)\}.$$

The lens-position signal LP is generated as a radial shift component of the objective lens with respect to the disc by the sum of the push-pull signals of the main beam and the subbeams. As will be described below, the lens-position signal LP is used to set a control range of the objective lens.

Functional Configuration of System Controller 212 According to the First Embodiment FIG. 4 is a functional block diagram of the system controller 212 (shown in FIG. 1), showing its functions relating to lens-position control. FIG. 4 shows a disc identifying unit 501, a lens-position control mode setting unit 502, and a sled servomechanism 503.

Referring to FIGS. 5A to 5C, operation of the disc identifying unit 501 will be described. FIG. 5B denotes a focus-error signal and FIG. 5C denotes disc-layer-detection pulses. Assume that the laser source of the optical pickup 202 emits laser light onto the disc surface while the object lens is brought towards the disc surface.

As shown in FIG. 5A, the objective lens focuses on a disc surface at a lens position 801 and the focus-error signal forms an S-shape. When approaching the disc surface, the objective lens focuses on a first recording layer at a lens position 802 and the focus-error signal again forms an S-shape.

When further approaching the disc surface, the objective lens focuses on a second recording layer at a lens position 803 and the focus-error signal again forms an S-shape. The disc-layer-detection pulses as shown in FIG. 5C are generated from the signal containing these S-shaped zero-crossing points. Accordingly, by counting the number of disc-layer-detection pulses while the objective lens is moving, the number of recording layers of the disc can be identified. By subtracting one from the number of disc-layer-detection pulses, the number of recording layers N can be obtained. Whether the disc is a single-layer recording medium or a multilayer recording medium can also be identified.

Referring to FIGS. 6A and 6B, operation of the lens-position control mode setting unit 502 and the sled servomechanism 503 will be described. FIGS. 6A and 6B illustrate control operations performed by the sled servomechanism 503, in which FIG. 6A illustrates the operation under mode 1, and FIG. 6B illustrates the operation under mode 2. The difference between the two modes is the control range of the objective lens.

In FIG. 6A, the level of the lens-position signal LP, which indicates the position of the objective lens relative to the optical pickup 202, is plotted on the ordinate. The lower and upper limits of the ordinate correspond to the limits of movement of the objective lens towards the center and edge of the disc, respectively. Time is plotted on the abscissa.

In the operation under the mode 1, as shown in FIG. 6A, the lens-position signal LP fluctuates in the range between thresholds Th1 and Th2, where the position of the objective lens is controlled. When the lens-position signal LP fluctuates between the points A and B in FIG. 6A, the AT/AF actuator causes the objective lens to follow the tracks from the center towards the edge of the disc.

When the lens-position signal LP reaches the threshold Th1 at the point B, the sled servomechanism 503 for controlling the optical pickup 202 is activated. Between the points B and C, the sled servomechanism 503 shifts the objective lens to a position corresponding to the threshold Th2. The sled servomechanism 503 stops shifting the optical pickup 202 at the point C, where the AT/AF actuator again controls the objective lens to follow the tracks with the beam spot. Between the points C and D, the objective lens follows the tracks, and between the points D and E, the sled servomechanism 503 shifts the optical pickup 202.

The operation under the mode 2 as shown in FIG. 6B will be described. The lens-position signal LP fluctuates in the range between thresholds Th3 and Th4, where the position of the objective lens is controlled. When the lens-position signal LP fluctuates between the points a and b, the AT/AF actuator causes the objective lens to follow the tracks from the center towards the edge of the disc.

When the lens-position signal LP reaches the threshold Th3 (Th3<Th1) at the point b, the sled servomechanism 503 for shifting the optical pickup 202 is activated and shifts the lens position at the threshold Th4 (Th4<Th2) between the points b and c. The sled servomechanism 503 stops shifting the optical pickup 202 at the point c, where the AT/AF actuator again controls the objective lens to follow the tracks with the beam spot. Between the points c and d, the objective lens follows the tracks, and between the points d and e, the sled servomechanism 503 shifts the optical pickup 202. The difference between the two modes is the control range of the objective lens, i.e, the mode 1>mode 2.

Figure 7A:
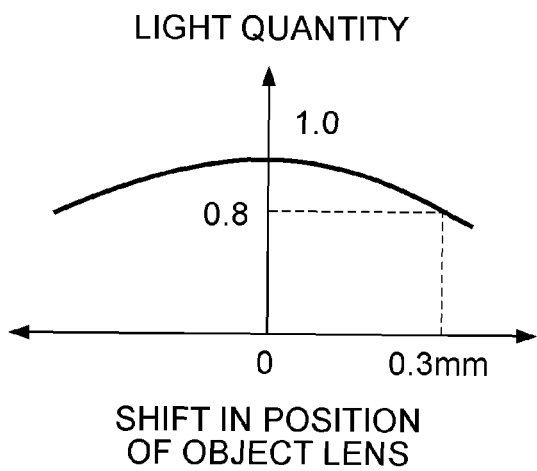
FIGS. 7A and 7B are graphs showing influences of a shift in position of the objective lens.
Figure 7B:
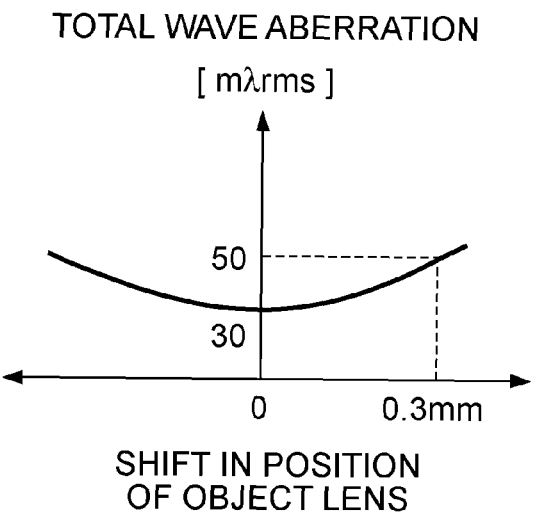

FIG. 7A and FIG. 7B are graphs showing the relationships between the shift in position of the objective lens and the light quantity, and the shift in position of the objective lens and the total wave aberration, respectively. In FIG. 7A, the amount of shift in the position of the objective lens is plotted on the abscissa, and the light quantity of the light emitted through the objective lens is plotted on the ordinate. Assume that the light quantity is one when the center of the objective lens is aligned with the optical axis, i.e., when the objective lens is at position zero. When the position of the objective lens is shifted by +0.3 mm, the light quantity is reduced to 0.8, showing about a 20% decrease in the light quantity. About a ±0.3 mm allowance is provided to compensate for misalignment between the objective lens, whose position is controlled by the AT/AF actuator, and the optical pickup.

In FIG. 7B, the amount of shift in the position of the objective lens is plotted on the abscissa, and the total wave aberration, which indicates the quality of the beam spot on the disc surface, is plotted on the ordinate. Assume that the aberration is 30 mλrms when the center of the objective lens is aligned with the optical axis, i.e., when the objective lens is at position zero. When the position of the objective lens is shifted by +0.3 mm, the aberration is increased to 50 mλrms.

Operation Flow According to the First Embodiment

Figure 8:
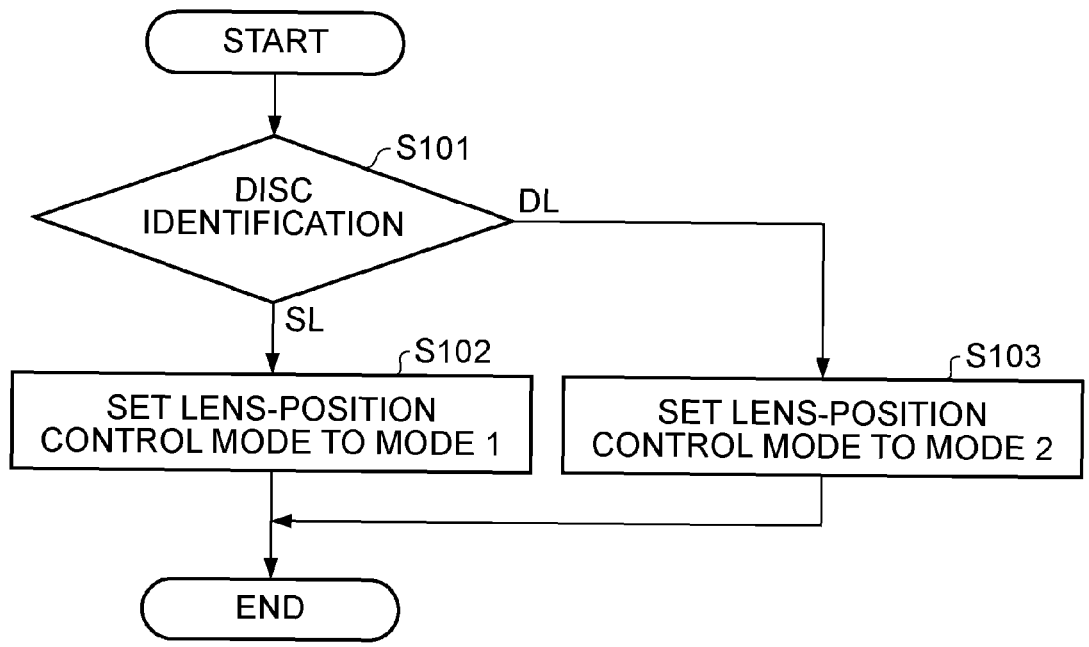
FIG. 8 illustrates an operation flow according to a first embodiment of the invention.

Referring to the flow chart shown in FIG. 8, operation according to the embodiment will be described. Accordingly, FIG. 8 illustrates an operation flow according to the first embodiment.

Step S101: Disc Identification

Disc identification is performed at the insertion of a disc or a startup of the apparatus. If the disc 201 is identified as a single-layer recording medium, the process proceeds to step S102, and if a double-layer (multilayer) recording medium, the process proceeds to step S103. The disc identification is performed by the method described above with reference to FIGS. 5A to 5C. That is, if the number of disc-layer-detection pulses shown in FIG. 5C is two, the disc is identified as a single-layer disc (single-layer recording medium), and if three, the disc is identified as a double-layer disc (multilayer recording medium). A control range of the objective lens is set on the basis of the identification result.

Step S102: Set Lens-Position Control Mode to Mode 1

If the disc is identified as a single-layer recording medium, the system controller 212 sets the lens-position control mode (i.e., the control range of the objective lens) to the mode 1.

Step S103: Set Lens-Position Control Mode to Mode 1

If the disc is identified as a multilayer recording medium, the system controller 212 sets the lens-position control mode to the mode 2.

Figures 9, 10:
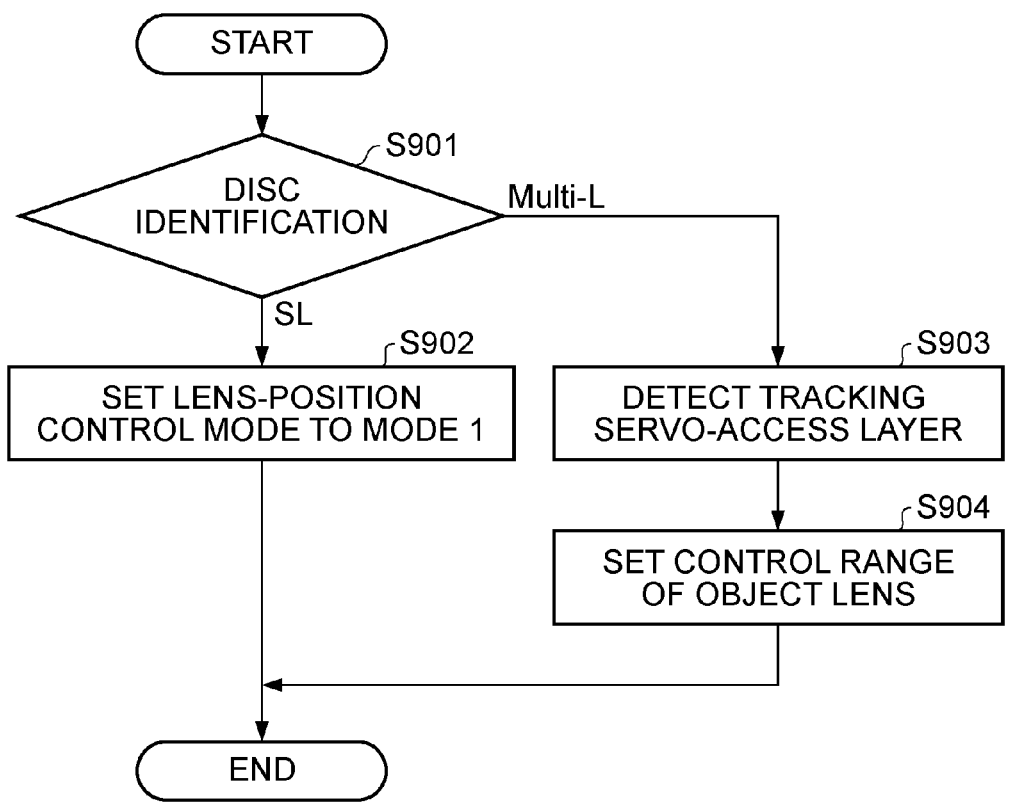
FIG. 9 is a table for setting control ranges of the objective lens, used in the first embodiment of the invention.
FIG. 10 illustrates an operation flow according to a second embodiment of the invention.

FIG. 9 is an exemplary table showing the lens-position control modes 1 and 2. The control range of the objective lens is set to ±300 μm in the mode 1, and to ±150 μm in the mode 2, which is only half of the range of that in the mode 1. Herein, the control range of the objective lens refers to the control range of the center of the objective lens.

Before setting the control range of the objective lens, the relationship between the lens-position signal LP and the travel distance of the objective lens is analyzed, and the result is stored in a memory. In a recording and/or reproducing operation, for example, as shown in FIG. 6A, the servo processor 210 limits the movement of the objective lens when it has reached a position corresponding to the threshold Th1 of the level of the lens-position signal LP.

In this embodiment, the control range of the objective lens is set to be small for a multilayer recording medium and large for single-layer recording medium, to minimize narrowing of a recording/reproducing margin due to a shift of the lens. As a result, lowering of the light quantity or occurrence of aberration can be minimized, and the recording/reproducing margin can be widened.

In the embodiment, the position of the objective lens relative to the optical pickup is controlled using the lens-position signal LP obtained from the sensor outputs. However, it may be controlled using a sensor for detecting a physical position of the objective lens. This applies to the following embodiments.

In the embodiment, the control mode is differentiated between the single-layer disc and the double-layer disc. However, it is clear from the idea of the invention that more than two control modes can be set depending on the number of recording layers.

SECOND EMBODIMENT

Now, an information recording and/or reproducing apparatus according to a second embodiment of the invention will be described. The functional configuration of the second embodiment is the same as that shown in FIG. 1, except that the control range of the objective lens is set for each of the recording layers in the case when the disc is a multilayer recording medium.

Operation Flow According to the Second Embodiment

FIG. 10 illustrates an operation flow according to the second embodiment.

Step S901: Disc Identification

Disc identification is performed at the insertion of a disc or a startup of the apparatus. If the disc is identified as a single-layer recording medium, the process proceeds to step S902, and if a multilayer recording medium, the process proceeds to step S903. The disc identification is performed by the same method as that in the first embodiment.

Step S902: Set Lens-Position Control Mode to Mode 1

If the disc is identified as a single-layer recording medium, the system controller 212 sets the lens-position control mode to the mode 1 as described above with reference to FIG. 8.

Step S903: Detect Tracking Servo-Access Layer

If the disc is identified as a multilayer recording medium as a result of the identification, the system controller 212 detects a tracking servo-access layer, i.e., a layer onto/from which information is recorded and/or reproduced, of the disc, by counting the number of disc-layer-detection pulses, as described above with reference to FIGS. 5A to 5C. That is, if the number of disc-layer-detection pulses is two, the tracking servo-access layer is identified as, from the light incident side, the first recording layer, and if three, the tracking servo-access layer is in the second recording layer.

Step S904: Set Control Range of Objective Lens

Figures 11, 12:
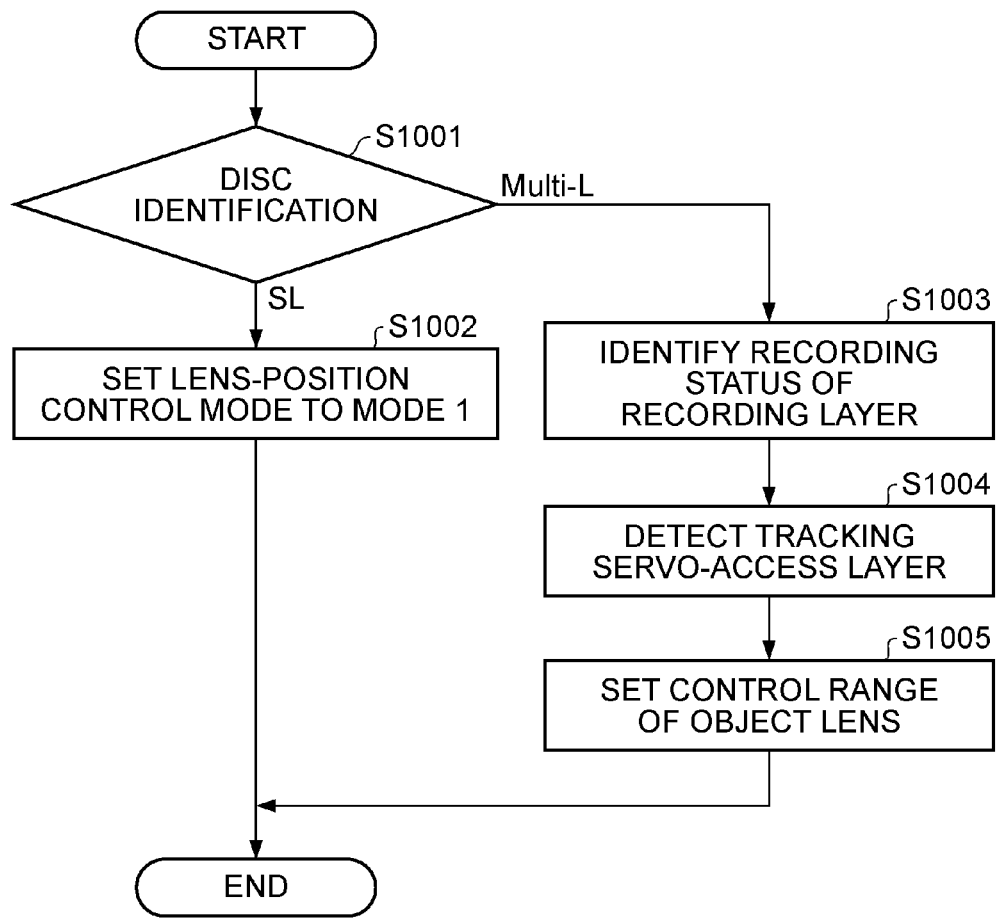
FIG. 11 is a table of control ranges of the objective lens for use in the second embodiment of the invention.
FIG. 12 illustrates an operation flow according to a third embodiment of the invention.

The system controller 212 sets the control range of the objective lens for each of the recording layers (tracking servo-access layers) according to the preliminarily created table. FIG. 11 is an exemplary table showing the lens-position control modes 3 and 4.

In FIG. 11, the control range of the objective lens is set for each of the first and second recording layers. The lens-position control mode of the first recording layer is set to the mode 3 and that of the second recording layer is set to the mode 4. The control range of the objective lens is set to ±200 μm in the mode 3, and to ±150 μm in the mode 4. In the second embodiment, the control ranges of the objective lens are set as described above with reference to FIG. 8.

As described above, in this embodiment, the control range of the objective lens is set for each of the recording layers of the disc. Typically, in the case of the double-layer disc, a recording layer L0 (first recording layer) has a recording/reproducing margin wider than that of a recording layer L1 (second recording layer).

In this embodiment, the lens-position control mode is differentiated between the first and second recording layers. However, it is clear from the idea of the invention that more than two control modes can be set, depending on the number of recording layers. By setting a smaller control range of the objective lens for a farther recoding layer of a multilayer recording medium, the recording/reproducing margin can be more assuredly obtained.

In this embodiment, the control range of the objective lens is differentiated between the first and second recording layers, whereby lowering of the light quantity or occurrence of aberration is effectively minimized. Thus, the recording/reproducing margin in the second recording layer can be more assuredly obtained.

Regarding the composition of a multilayer disc, it is necessary that a recording layer adjacent to the light incident surface be formed of a material having a particularly high transmissivity (for example, a Ge—Sb—Te series material). A farther recording layer may be provided with a metal reflective film having a cooling effect. This facilitates recrystallization of the recording layer annealed by the recording power, whereby the recording quality can be improved. Depending on the material and structure, the recording layer adjacent to the light incident surface may have a narrower recording/reproducing margin than a farther recording layer.

Depending on the characteristics of the medium, the first recording layer may have a narrower recording/reproducing margin than the second recording layer, or a subsequent recording layer. According to this embodiment, because the control range of the objective lens can be set appropriately, depending on the recording/reproducing margin of each of the recording layers, media with various characteristics can be handled.

THIRD EMBODIMENT

Now, an information recording and/or reproducing apparatus according to a third embodiment of the invention will be described. The functional configuration of the third embodiment is the same as that shown in FIG. 1, except that, in addition to the second embodiment, the recording status, i.e., whether the recording layer is recorded or unrecorded, is identified. Depending on the identification result, the control range of the objective lens is set for each of the recording layers.

Operation Flow According to the Third Embodiment

FIG. 12 illustrates an operation flow according to the third embodiment.

Step S1001: Disc Identification

Disc identification is performed at the insertion of a disc or a startup of the apparatus. If the disc is identified as a single-layer recording medium, the process proceeds to step S1002, and if a multilayer recording medium, the process proceeds to step S1003. The disc identification is performed according to the flow charts in FIGS. 8 and 10.

Step S1002: Set Lens-Position Control Mode to Mode 1

The system controller 212 sets the lens-position control mode to mode 1 and performs subsequent control of the objective lens-position under the mode 1. The mode 1 is, as described above, one of the lens-position control modes shown in FIG. 9.

Step S1003: Identification of Recording Status of the Recording Layer

The system controller 212 identifies the recording status of each of the recording layers of a multilayer recording medium, i.e., whether each of the recording layers of a disc is recorded or unrecorded is identified. The recording status of the recording layers can be identified from, for example, management information of the disc. If even a small piece of data is recorded in the recording layer of the disc, the recording layer is identified as being recorded.

Step S1004: Detect Tracking Servo-Access Layer

The system controller 212 detects a tracking servo-access layer, according to the flow chart of FIG. 10.

Step S1005: Set Control Range of Objective Lens

The system controller 212 sets the control range of the objective lens according to the table preliminarily created for each of the tracking servo-access layers. The control range of the objective lens is set according to the flow charts of FIGS. 8 and 10. The table specifies a control range of the objective lens for each of the tracking servo-access layers, depending on the recording status of a recording layer adjacent to the tracking servo-access layer.

Figures 13, 14:
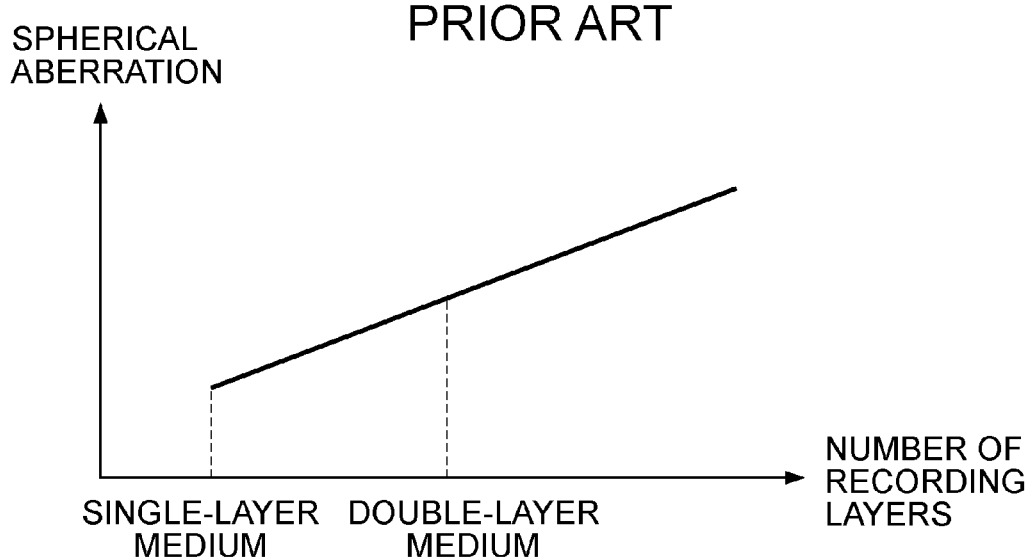
FIG. 13 is an exemplary table showing control ranges of the objective lens.
FIG. 14 illustrates the relationship between the number of recording layers of a multilayer disc and spherical aberration.

FIG. 13 is an exemplary table showing control ranges of the objective lens. As shown in FIG. 13, control ranges of the objective lens are set for each of the first and second recording layers, depending on the recording status of the recording layer adjacent to the tracking servo-access layer. For example, the control range of the objective lens for the first recording layer of a disc is set to ±150 μm, if the adjacent second recording layer is recorded. If the second recording layer is unrecorded, the control range is set to ±200 μm.

Likewise, the control range of the objective lens for the second recording layer of a disc is set to ±100 μm, if the adjacent first recording layer is recorded. If the first recording layer is unrecorded, the control range is set to ±150 μm. By setting the control ranges of the objective lens depending on the recording status of the recording layer adjacent to the tracking servo-access layer, the recording/reproducing margin corresponding to the recording status of the recording layer can be obtained.

In this embodiment, the control mode is differentiated between the cases of the first and second recording layers. However, it is clear from the invention that more than two control modes can be set depending on the number of recording layers.

According to the invention, a recording/reproducing margin in a multilayer recording medium can be obtained with a simplified structure. By setting a smaller control range of the objective lens for a multilayer recording medium than that for a single-layer recording medium, a lowering of light quantity or an occurrence of aberration can be effectively minimized. By setting a control range of the objective lens for each of the recording layers, the recording/reproducing margin can be further widened. In recording and/or reproducing information onto/from a multilayer recording medium, by setting control ranges of the objective lens for each of the recording layers, depending on the recording status of the recording layer adjacent to the tracking servo-access layer, the recording/reproducing margin can be widened, depending on the recording status of the medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Except as otherwise discussed herein, the various components shown in outline or in block form in the Figures are individually well known and their internal construction and operation are not critical either to the making or using or to a description of the best mode of the invention.

What is claimed is:

1. An apparatus for effecting at least one of recording of information on and reproducing of information from a recording medium, said apparatus comprising:
   (a) an optical pickup including:
      (i) a laser source for emitting a light beam;
      (ii) an objective lens for focusing the light beam emitted from the laser source onto the recording medium; and
      (iii) an actuator for driving the objective lens in a tracking direction of the recording medium;
   (b) a sled mechanism for driving the optical pickup in the tracking direction of the recording medium; and
   (c) a system controller including:
      (i) a disc identifying unit for identifying whether the recording medium is a single-layer recording medium having one recording layer or a multilayer recording medium having a plurality of recording layers; and
      (ii) a lens-position control unit for setting a movable range of the objective lens in the tracking direction according to a result of an identification performed by the disc identifying unit and for controlling the sled mechanism such that the objective lens is positioned in the movable range.

2. An apparatus according to claim 1, wherein, if the disc identifying unit identifies the recording medium as a multilayer recording medium, the lens-position control unit sets the movable range of the objective lens for each of the recording layers.

3. An apparatus according to claim 2, wherein the system controller identifies a recording status of each of the recording layers of the recording medium, and the lens-position control unit sets the movable range of the objective lens depending on the recording status of a recording layer adjacent to each of the recording layers.

4. An apparatus according to claim 2, wherein the lens-position control unit sets the movable range of the objective lens to be less than that for a recording layer positioned farther from a side on which the light beam is incident.

5. An apparatus according to claim 3, wherein the lens-position control unit sets the movable range of the objective lens to be less than that for a recording layer positioned farther from a side on which the light beam is incident.

* * * * *